United States Patent
Hayes

(10) Patent No.: US 8,417,530 B1
(45) Date of Patent: Apr. 9, 2013

(54) ACCENT-INFLUENCED SEARCH RESULTS

(75) Inventor: Barry Hayes, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 320 days.

(21) Appl. No.: 12/860,069

(22) Filed: Aug. 20, 2010

(51) Int. Cl.
*G10L 21/00* (2006.01)

(52) U.S. Cl. ............. 704/270.1; 704/270; 704/1; 704/9; 704/231

(58) Field of Classification Search ................ 704/1–10, 704/270–272, 706–788
See application file for complete search history.

(56) References Cited

U.S. PATENT DOCUMENTS

| | | | | |
|---|---|---|---|---|
| 6,249,763 | B1 * | 6/2001 | Minematsu | 704/252 |
| 6,665,644 | B1 * | 12/2003 | Kanevsky et al. | 704/275 |
| 6,714,911 | B2 * | 3/2004 | Waryas et al. | 704/271 |
| 7,155,391 | B2 * | 12/2006 | Taylor | 704/257 |
| 7,953,219 | B2 * | 5/2011 | Freedman et al. | 379/265.06 |
| 8,156,114 | B2 * | 4/2012 | Byers | 707/725 |
| 8,195,460 | B2 * | 6/2012 | Degani et al. | 704/243 |
| 8,204,884 | B2 * | 6/2012 | Freedman et al. | 707/737 |
| 2007/0136266 | A1 * | 6/2007 | Su et al. | 707/4 |
| 2007/0208570 | A1 * | 9/2007 | Bhardwaj et al. | 704/270.1 |
| 2008/0221902 | A1 * | 9/2008 | Cerra et al. | 704/270.1 |
| 2008/0290987 | A1 * | 11/2008 | Li | 340/5.1 |
| 2009/0164446 | A1 * | 6/2009 | Holt et al. | 707/5 |
| 2009/0164929 | A1 * | 6/2009 | Chen et al. | 715/769 |
| 2009/0204243 | A1 * | 8/2009 | Marwaha et al. | 700/94 |
| 2010/0082329 | A1 * | 4/2010 | Silverman et al. | 704/8 |
| 2010/0082658 | A1 * | 4/2010 | Athsani et al. | 707/767 |
| 2011/0035219 | A1 * | 2/2011 | Kadirkamanathan et al. | 704/239 |
| 2011/0106527 | A1 * | 5/2011 | Chiu | 704/9 |
| 2011/0144973 | A1 * | 6/2011 | Bocchieri et al. | 704/2 |

OTHER PUBLICATIONS

Tao Chen et al., "Automatic Accent Identification Using Gaussian Mixture Models," Microsoft Research China, Department of Automation, Tsinghua University, 4 pages. (2001).

Keikichi Hirose et al., "Accent Type Recognition and Syntactic Boundary Detection of Japanese Using Statistical Modeling of Moraic Transitions of Fundamental Frequency Contours," Dept. of Information and Communication Engineering, School of Engineering, University of Tokyo, 4 pages. (1998).

* cited by examiner

*Primary Examiner* — Douglas Godbold
(74) *Attorney, Agent, or Firm* — Fish & Richardson P.C.

(57) ABSTRACT

Methods, systems, and apparatus, including computer programs encoded on a computer storage medium, for generating search results. In one aspect, a method includes obtaining a transcription of a voice query, and data that identifies an accent of the voice query, submitting the transcription and the data that identifies the accent of the voice query to a search engine to generate one or more accent-influenced results of the voice query, and providing the accent-influenced results to a client device for display.

16 Claims, 3 Drawing Sheets

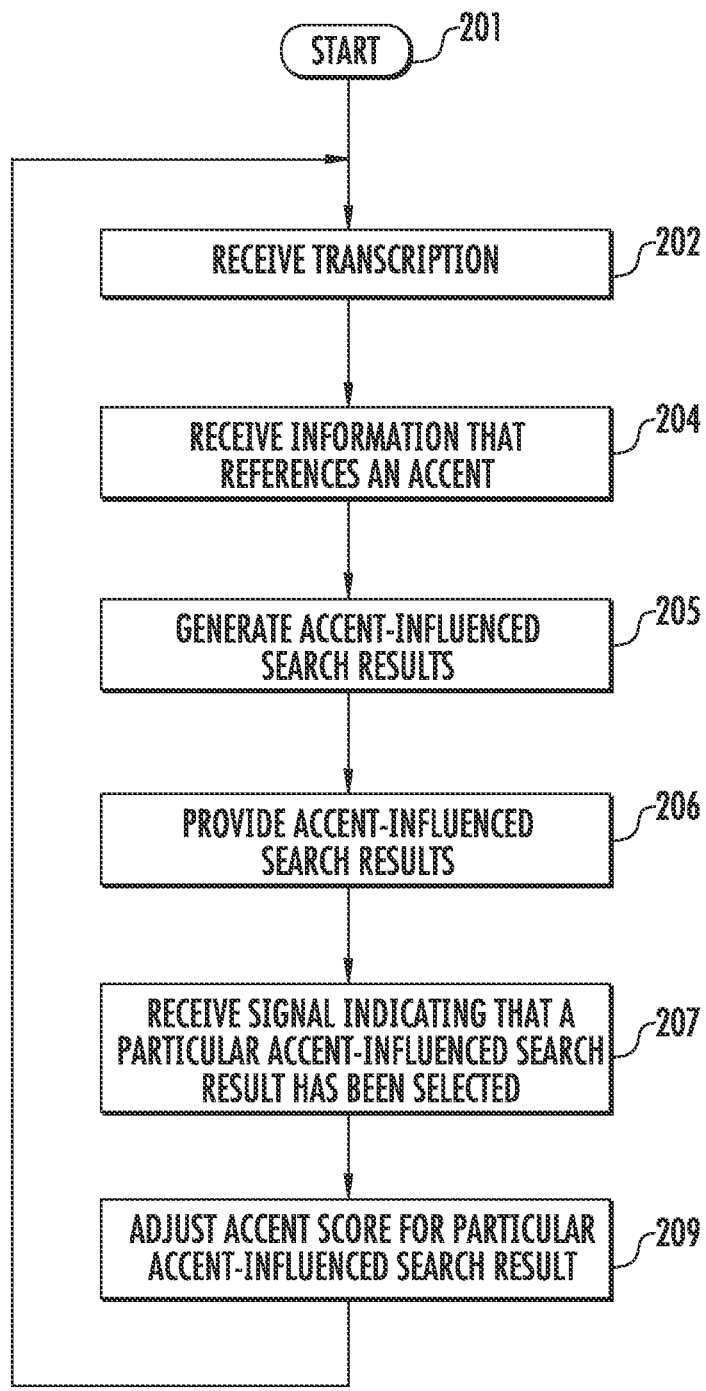

ACCENT-INFLUENCED SEARCH RESULTS

BACKGROUND

This specification relates to search engines.

A user of a mobile device may enter query terms by, for example, typing on a keyboard or speaking a voice query into a microphone. In transcribing a voice query for a search engine, an Automated Search Recognition ("ASR") engine may attempt to eliminate or reduce the effect of a user's accent, by treating the accent as though it were noise. In doing so, the ASR engine shields the accent from the search engine.

SUMMARY

In general, one innovative aspect of the subject matter described in this specification may be embodied in methods for influencing the selection and ranking of search results that a search engine generates for a voice query, based on the accent of the voice query received. Specifically, data identifying an accent of the voice query is provided to a search engine along with transcribed query terms, and the search engine returns ranked search engine results that satisfy the voice query, and that are tailored to based on that accent.

By including the accent of a voice query as an input to the search result generation process, search result rankings can be biased to offer preferred results to accented voice queries. For example, if English-language speakers with a French-language accent show a preference for a particular result for the query terms "restaurants in Scranton" than do English-language speakers with a Russian-language accent, a search engine will be more likely to select that particular result for another user who provides a voice query in the English language with a French-language accent. The preference for that particular search result would not be reflected in search results that are generated for other users that do not have that particular accent.

As used by this specification, a "search query" (or, when spoken, a "voice query" or a "voice-based search query") includes one or more query terms that a user submits to a search engine when the user requests the search engine to execute a search, where a "term" or a "query term" includes one or more whole or partial words, characters, or strings of characters. Among other things, a "result" (or a "search result") of the search query includes a Uniform Resource Identifier (URI) that references a resource that the search engine determines to be responsive to the search query. The search result may include other things, such as a title, preview image, user rating, map or directions, description of the corresponding resource, or a snippet of text that has been automatically or manually extracted from, or otherwise associated with, the corresponding resource.

Furthermore, an "accent" refers to a manner of pronunciation of a language, where accents may be shared by people with similar backgrounds, such as people who speak the same native language or the same dialect of a language. A particular language may be associated with one accent, i.e., an "English-language accent," or with more than one accent, i.e., an American English-language accent, a Southern United States English-language accent, or a British English-language accent. "Accent-influenced search results," are search results that have been selected or ranked by a search engine based at least in part on an accent associated with the voice query. For instance, when the user submits a voice query, accent-influenced search results may include search results that have been selected or ranked by a search engine based, among other things, on an accent detected in the voice query.

In general, another innovative aspect of the subject matter described in this specification may be embodied in methods that include the actions of obtaining a transcription of a voice query, and data that identifies an accent of the voice query, submitting the transcription and the data that identifies the accent of the voice query to a search engine to generate one or more accent-influenced results of the voice query, and providing the accent-influenced results to a client device for display.

Other embodiments of these aspects include corresponding systems, apparatus, and computer programs, configured to perform the actions of the methods, encoded on computer storage devices.

These and other embodiments may each optionally include one or more of the following features. In various examples, obtaining the transcription and the data that identifies the accent of the voice query further includes receiving the transcription and the data that identifies the accent of the voice query from an automated speech recognition (ASR) engine; the actions include receiving a signal indicating that a user with the accent has or has not expressed interest in or satisfaction with a particular accent-influenced result, and adjusting a score associated with the particular accent-influenced result and the accent, based on receiving the signal; adjusting the score further includes incrementing the score associated with the particular accent-influenced result and the accent when the signal indicates that the user with the accent has expressed interest in or satisfaction with the particular accent-influenced result; adjusting the score further includes decrementing the score associated with the particular accent-influenced result and the accent when the signal indicates that the user with the accent has not expressed interest in or satisfaction with the particular accent-influenced result; providing the accent-influenced results includes providing results that have been selected by the search engine based on both the transcription and the accent of the voice query; providing the accent-influenced results includes providing results that have been selected by the search engine based on the transcription, and that have been ranked by the search engine based on the accent of the voice query; providing the accent-influenced results includes providing one or more results that are expressed in a first language, and one or more results that are expressed in a second, different language that is associated with the accent of the voice query; the accent is identified by a user selection or preference; and/or the accent is identified algorithmically.

Particular embodiments of the subject matter described in this specification may be implemented to realize one or more of the following advantages. Search results may be adapted based on preferences that may be shared among users that speak the same language. Users may review search results that were deemed interesting or satisfying by other users who share certain similarities with the user, such as a common background, native language, or region of origin. Users may find relevant search results more quickly, improving the overall search experience.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

FIG. 2 is a flowchart of an example process.

Like reference symbols in the various drawings indicate like elements.

DETAILED DESCRIPTION

Figure 1:
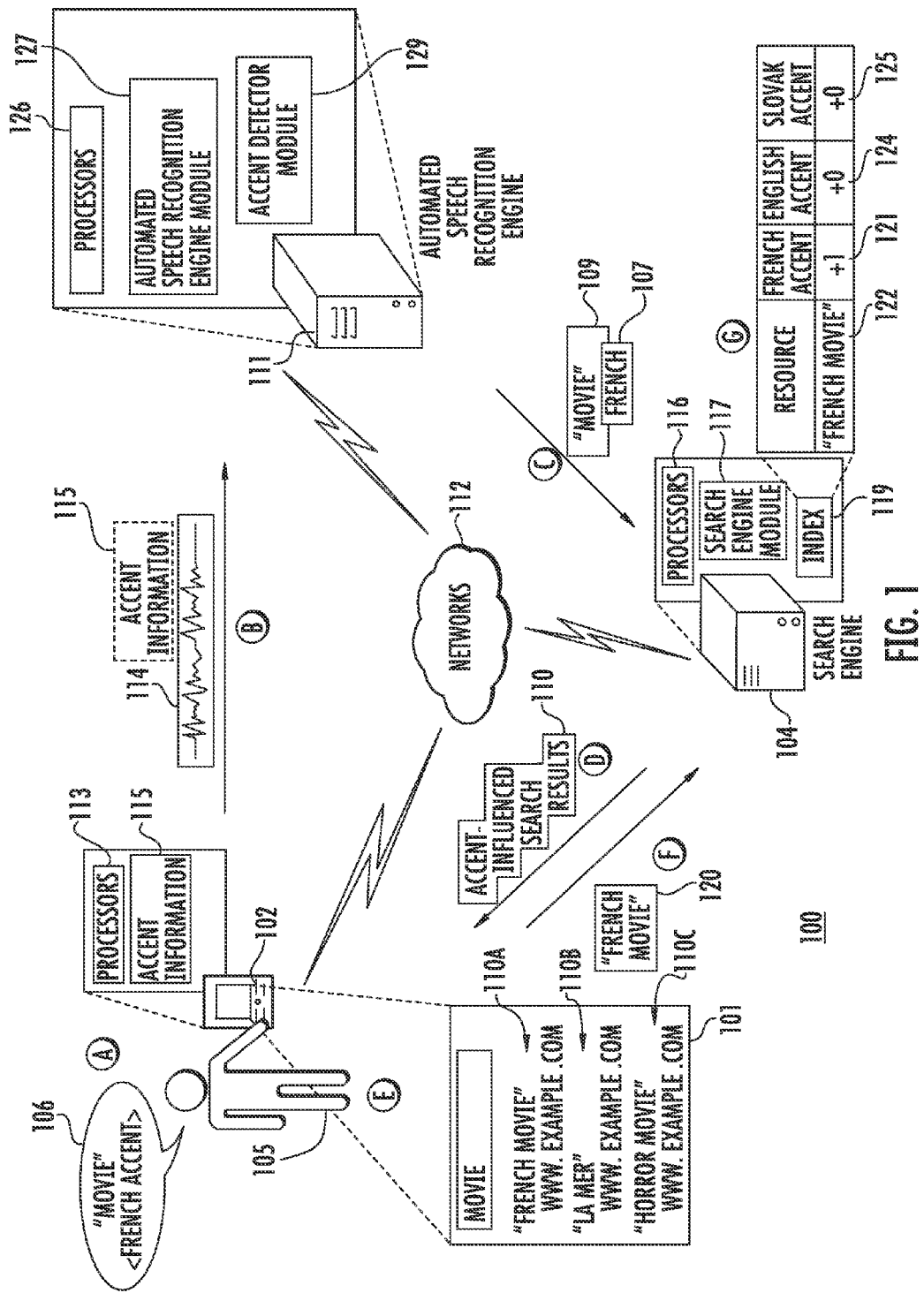
FIG. 1 is a diagram of an example system that can generate accent-influenced search results.

FIG. 1 is a diagram of an example system 100 that can generate accent-influenced search results. FIG. 1 also illustrates a flow of data within the system 100 during states (a) to (g), as well as a user interface 101 that is displayed on a mobile device 102 of the system 100 during state (e). In practice, the states (a) to (g) may occur in the illustrated sequence, or they may occur in a sequence that is different than is illustrated.

Briefly, the search engine 104 may select or rank (or, collectively, "influence") the results that are generated in response to a voice query 106 (which, in the figure, includes the spoken query term "movie"), based on any number of signals or inputs. In some implementations, instead of shielding the accent of the voice query from the search engine 104, the Automated Search Recognition (ASR) engine 111 may provide data that identifies the accent to the search engine 104, so that the search engine 104 may influence the results based on this additional item of information.

For instance, data 107 identifying the accent of the voice query (in the figure, a "French"-language accent) may be provided to the search engine 104 along with the transcription 109 of the voice query 106, and the search engine 104 may return ranked search engine results 110 that satisfy the voice query, and that are selected or ranked based in part on the identified accent. The selection or ranking of search results based on a user's accent reflects the understanding that users with similar accents may be interested in similar search results and, conversely, users with similar accents may not be interested in search results in which other users who do not share the same accent are interested. It should be appreciated, of course, that users with similar accents do not necessarily share the same interests or preferences, and that leveraging accent information is only an optional technique that may be used for improving perceived quality of search results.

The system 100 includes the mobile device 102, the search engine 104, and the ASR engine 111, which are in communication with each other over one or more networks 112. The mobile device 102 may be a mobile phone, a tablet computer, a music player, an e-book reader, a laptop or desktop computer, PDA, smart phone, or other handheld or mobile device that includes one or more processors 113.

The search engine 104 is made up of one or more computing devices (i.e., servers that include one or more processors 116) that search for information on the networks 112, and the ASR engine 111 is made up of one or more computing devices (i.e., servers that include one or more processors 126) that convert speech to text. The search engine 104 and the ASR engine 111 may be implemented on the same device, or on different devices. The networks 112 may include a wireless cellular network, a wireless local area network (WLAN) or Wi-Fi network, a Third Generation (3G) or Fourth Generation (4G) mobile telecommunications network, a private network such as an intranet, a public network such as the Internet, or any appropriate combination thereof.

During state (a), the user 105 initiates a search dialogue, and speaks the voice query 106 into a microphone of the mobile device 102. The user may, for example, press a button on the mobile device 102 before speaking, speak the voice query, then release the button on the mobile device 102. In another example, the user may select a user interface control (e.g., a microphone icon) on the client device 102 before speaking the voice query.

As yet another example, the microphone may be "on" before the user speaks or may be in an "always-on" state (e.g., the user may simply speak without turning on the microphone), such as where the mobile device uses a continuous recording buffer. The mobile device 102 encodes the voice query 106 into an audio signal 114 (or "sample," or "waveform") which, for example, may be a two-second (or more) snippet of relatively high quality audio, such as sixteen kilohertz lossless audio.

During state (b), the mobile device 102 communicates the audio signal 114 and, optionally, accent data 115 over the networks 112 to the ASR engine 111. For example, the mobile device 102 may create a sound file or data stream when recording the voice query 106, and may send the sound file or data stream over the networks 112. In some implementations, the mobile device 102 may establish a session with the ASR engine 111, and may send the audio signal 114 during the session.

The accent data 115 references an accent associated with the user 105 of the mobile device 102. For instance, the accent data 115 may be a textual description of the accent of the voice query (e.g., "Slovak-language," "Icelandic-language," "Afrikaans-language") encoded, for example, in an eXtensible Markup Language (XML) file, or the accent data may include a bit field that includes flag bits can be used by the ASR engine 111 or the search engine 104 to identify a particular accents.

The accent data 115 may reference an accent that is associated with a language that is different than the language of the voice query 106 (e.g., a Portuguese-language accent and an English-language voice query), or an accent that is associated with the same language as the voice query (e.g., an American-English or British-English accent with an English-language voice query). A table stored on the ASR engine 111 or the search engine 119 may cross-reference accents with languages or regions.

The accent associated with the user 105 may be explicitly identified or input by the user 105 or, if the user 105 opts to allow such a determination, the accent may be automatically determined by the mobile device 102 based on an analysis the user's usage history or speech. For instance, the accent data 115 may be stored when the user specifies their native language or country of origin, or when an accent-identifying application running on the mobile device 115 or another device identifies the accent based on analyzing the user's speech or based on analyzing the resources that the user 105 has accessed in the past. Such applications may implement the automated accent-identifying processes described, for example, in K. Hirose et al., "Accent Type Recognition And Syntactic Boundary Detection Of Japanese Using Statistical Modeling Of Moraic Transitions Of Fundamental Frequency Contours," Proc. IEEE ICASSP'98 (1998), or T. Chen et al., "Automatic Accent Identification using Gaussian Mixture Models," IEEE Workshop on ASRU (2001).

The ASR engine 111 receives the audio signal 114 and the accent data 115, if provided. The ASR engine module 127 generates a transcription 109 of the voice query 106, and obtains data identifying the accent of the voice query. The data identifying the accent may be obtained from the accent data 115 or, when the user 105 opts to allow such a determination, the accent may be automatically determined by the ASR engine 111 based on an analysis of the user's usage history (e.g., using the accent detector module 129).

For privacy protection, any historical, behavioral or other data gathered can be made on an opt-in basis. Gathered data can be anonymized by various means. For example, the search engine can provide additional query suggestions that are both relevant to the user's history while also protecting the user's privacy. Search history data can be anonymized for privacy protection, so that the data, if compromised, cannot be associated with a particular user or user identifier. Various anonymization processes, such as hashing, encryption and obfuscation techniques, can be used to ensure that subject privacy is protected.

When the accent data 115 is not communicated to the ASR engine 111, the ASR engine 111 may determine that the user 105 does not have a discernable accent, (e.g., the ASR engine 111 cannot detect an accent, or the user does not have an accent), or that the mobile device 102 does not have sufficient information to identify the accent. When the accent data 115 is communicated to the ASR engine 111, the ASR engine 111 may use the accent data 115 to determine the accent of the voice query, or the ASR engine may ignore the accent data 115 and perform an independent analysis to determine the accent. Regardless of the derivation, the ASR engine 111 generates data 107 that identifies the accent of the voice query. The data 107 may be, or may include the same data as, the accent data 115.

The ASR engine 111 may perform speech recognition by matching the sounds that of the voice query 106 with candidate transcriptions that it determines the speaker may have spoken. The ASR engine 111 uses various noise models, acoustic models, language models, popularity models, and other models to accomplish speech recognition. The ASR engine 111 may, for example, use an acoustic model to select candidate transcriptions based on whether their corresponding sounds are an acoustic match to the sounds that correspond to the voice query, and may rank or select the candidate transcriptions based on the fit or closeness of the acoustic match, or based on other factors.

During state (c), the ASR engine 111 communicates one or more transcriptions and the data 107 identifying the accent of the voice query, over the networks 112 to the search engine 104. The one or more transcriptions may include the single transcription having a highest speech recognition confidence score. The search engine 104, which includes, among other things, a search engine module 117 and an index 119 of resources, performs one or more search queries using both the transcription 109 and the data 107 that identifies the accent. Because the search engine 104 performs the search queries using the data 107 that identifies the accent, the search results 110 that are generated are accent-influenced search results.

Different accents may yield the same or different accent-influenced search results. In one example, the search engine 104 may select different search results for a voice query that has an accent than for a voice query that does not have an accent, or for a voice query with a different accent. For instance, for a user that does not have a discernable accent, the search engine 104 may only select search results that match the language of the voice query but, for a user that does have a discernable accent, the search engine 104 may select search results that match the language of the voice query and search results that match a language associated with the accent. The search engine may expand the languages that are acceptable for the search result, for example, using a look-up table that cross-references accents with languages. For a user that has an accent, the search engine 104 may select search results based on accent scores that reflect the extent to which other past users with the same accent expressed interest in or satisfaction with a corresponding search result.

In another example, the search engine may rank search results differently for a user that has an accent than for a user that does not have a discernable accent, or for a user with a different accent. For instance, the search engine 104 may select the same search results regardless of accent, but may rank the search results based on an accent score.

In FIG. 1, in the search engine 104 has selected search results 110A to 110C ("French Movie," "La Mer," and "Horror Movie") in response to the transcription 109 ("Movie") and the data 107 that identifies the accent ("French," referring to a French-language accent) of the user 105. For a user that does not have a French-language accent, the search engine selects different search results or may rank one or more of the search results 110A to 110C differently. In particular, for a user without a French-language accent, the search result 110A may not be selected as a search result, or may be assigned a lower rank.

During state (d), the search engine 104 communicates the search results 110 over the networks 112 to the mobile device 102, for display. In doing so, the search engine 104 may generate a file that references search results 110, where the file may be a markup language file, such as an eXtensible Markup Language (XML) or HyperText Markup Language (HTML) file.

The mobile device 102 receives the search results 110 and, during state (e), displays the search results 110a to 110c on the user interface 101. When, during state (f), the user hovers a cursor over or selects the search result 110a, the mobile device 102 communicates a message 120 over the networks 112 to identify the particular search result 110A to the search engine 104.

The search engine 104 receives the message 120 and, during state (g), updates the index 119 of the search results to reflect that a user with an identified accent has expressed interest or satisfaction in the particular search result 110A. For example, the search increments a French-language accent score 121 for the resource 122 associated with the search result 110a, since the user 105 has a French-language accent and has selected the search result 110. Since the user 105 does not have an English-language accent or a Slovak-language accent (or other accent), the search engine 104 does not adjust the English-language accent score 124 or the Slovak-language accent score 124.

The search engine 104 uses these accent scores to generate other accent-influenced search results for subsequent users who have an identifiable accent. For instance, after the user 105 has selected the particular search result 110A, the search engine 104 will be more likely to select the particular search result 110A for subsequent users who also have a French-language accent, or will be more likely to assign a high rank the particular search result 110A. Because the accent scores may be considered to be query-independent measures, the search engine 104 may be more likely to select or assign a high rank to the particular search result 110A even if the subsequent users submit different voice queries. Because the accent scores may be considered to be accent-dependent measures, however, the selection of the particular search result 110A by the user 105 may not affect the selection or ranking of the particular search result 110A by the search engine 104 in response to a voice query from a subsequent user with a different accent.

FIG. 2 is a flowchart of an example process 200. Briefly, the process 200 includes obtaining a transcription of a voice query, and data that identifies an accent of the voice query, submitting the transcription and the data that identifies the accent of the voice query to a search engine to generate one or more accent-influenced results of the voice query, and providing the accent-influenced results to a client device for display to the user.

In more detail, when the process 200 begins (201), a transcription of a voice query is received (202). The transcription may be generated by an ASR engine that receives an audio signal that correspond to the voice query, and that selects the transcription based on whether the sounds that correspond to the transcription are an acoustic match to the sounds that correspond to the audio signal. The transcription may be communicated as a textual transcript from the ASR engine to a search engine over a network, or the ASR engine may be implemented as part of a search engine. The ASR engine may also communicate the audio signal with the transcription.

Data that references an accent of a user that submitted the voice query is received (204). The data may be generated by a device that receives the voice query, by the ASR engine, or by the search engine. The data may be a textual description of the accent of the voice query, or the accent may be represented some other way (e.g., as a flag bit). The data that references the accent of the voice query may be supplied by the user, for example as set in a user preference, or the data that references the accent may be automatically generated, for example by a software application that automatically identifies an accent type from a speech sample.

Accent-influenced search results are generated (205), and are provided for display to the user (206). The results are selected or ranked by a search engine based at least in part on an accent associated with the user that submitted the search query, and with accent scores that may be associated with each search result. For instance, generating search results may include selecting the search results that have the n highest accent scores for the accent associated with the voice query. Alternatively generating search results may include weighting a query-independent or query-dependent measure associated with each search result by a corresponding accent score associated with the accent of the voice query, and selecting the search results with the n highest weighted, query-independent or query-dependent measures.

When signal is received from the user (207), an accent score for a particular accent-influenced search results is adjusted (209). The signal may indicate that the user has or has not expressed interest or satisfaction in a particular accent-influenced search results. Interest or satisfaction in a particular search result may be determined based on whether the user has hovered a cursor over or has selected the particular search result, or based on other metrics such as click-thru-rate (CTR) or click duration. The process 200 continues as the user or other users submit additional voice queries.

Figure 3A:
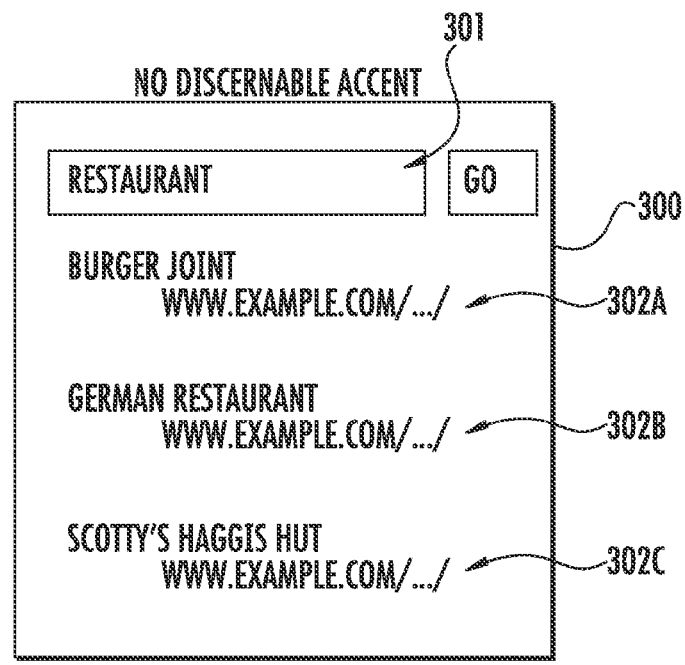
FIGS. 3A and 3B show example user interfaces.
Figure 3B:
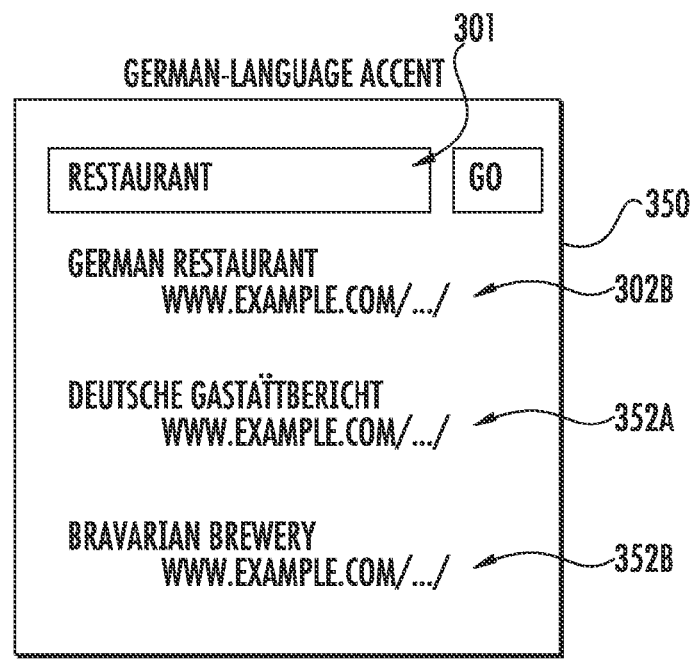

FIGS. 3A and 3B show example user interfaces 300 and 350, respectively. In particular, the user interface 300 is a search engine results page that is generated by a search engine when a user submits the query term 301 (in the figure, "restaurant"). Because the user interface 300 is generated for a user that has no discernable accent, that has an English-language accent (e.g., an American English-language accent), or that has an accent that cannot be identified, the search results 302A to 302C are general search results that are not influenced by accent data, e.g. they do not relate to a particular background, language or geography that might be reflected in an accent.

By contrast, the user interface 350 is a search engine results page that is generated when a user with a German-language accent submits the same query term 301. Because the search engine takes the accent into account when selecting search results and generating the search engine results page, the search engine has selected accent-influenced search result 302B (associated with a German restaurant), search result 352A (a German-language search result associated with a German restaurant review site), and search result 352B (associated with a German brewery). The selection of search results 302B, 352A and 352B by the search engine may be based in part on the past selection of these results by other users who have submitted voice queries with German-language accent information. Notably, the search result 302B is selected as a search result for the voice query that does not have a German-language accent (FIG. 3A) as well as for the voice query that does not have a German-language accent (FIG. 3B). The search result 302B may be ranked higher for voice queries that are associated with German-language accents than for voice queries that are not associated with German-language accents, because, for example, users who have submitted voice queries that are associated with a German-language accent may have selected the search result 302B more frequently than users who have submitted voice queries that are not associated with a German-language accent, or more frequently than most or all users.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode data for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A system comprising:
one or more computers; and
a computer readable medium coupled to the one or more computers having instructions stored thereon which, when executed by the one or more computers, cause the one or more computers to perform operations comprising:
obtaining a transcription of a voice query;
obtaining data that identifies an accent of the voice query;
submitting (i) the transcription of the voice query and (ii) the data that identifies the accent of the voice query, to a search engine;
in response to submitting (i) the transcription of the voice query and (ii) the data that identifies the accent of the voice query, to a search engine, receiving one or more search results;
providing one or more of the search results to a client device for display;
in response to providing the one or more search results, receiving a signal indicating that a user has or has not expressed interest in or satisfaction with a particular search result; and
adjusting a score associated with both the particular search result and the identified accent based on the signal, wherein adjusting the score comprises incrementing the score when the signal indicates that the user has expressed interest in or satisfaction with the particular search result, or decrementing the score when the signal indicates that the user has not expressed interest in or satisfaction with the particular search result.

2. The system of claim 1, wherein obtaining the transcription and the data that identifies the accent of the voice query further comprises receiving the transcription and the data that identifies the accent of the voice query from an automated speech recognition (ASR) engine.

3. The system of claim 1, wherein providing search results comprises providing results that have been selected by the search engine based on both the transcription and the identified accent of the voice query.

4. The system of claim 1, wherein providing the search results comprises providing results that have been selected by the search engine based on the transcription, and that have been ranked by the search engine based on the identified accent of the voice query.

5. The system of claim 1, wherein providing the search results comprises providing one or more results that are expressed in a first language, and one or more results that are expressed in a second, different language that is associated with the identified accent of the voice query.

6. The system of claim 1, wherein the accent is identified by a user selection or preference.

7. The system of claim 1, wherein the accent is identified algorithmically.

8. The system of claim 1, wherein data that identifies the accent comprises one of an encoded textual description of the accent or a bit field that includes flag bits to identify the accent.

9. A computer storage medium encoded with a computer program, the program comprising instructions that when executed by one or more computers cause the one or more computers to perform operations comprising:
   obtaining a transcription of a voice query;
   obtaining data that identifies an accent of the voice query;
      submitting (i) the transcription of the voice query and (ii) the data that identifies the accent of the voice query, to a search engine;
      in response to submitting (i) the transcription of the voice query and (ii) the data that identifies the accent of the voice query, to a search engine, receiving one or more search results;
   providing one or more of the search results to a client device for display
      in response to providing the one or more search results, receiving a signal indicating that a user has or has not expressed interest in or satisfaction with a particular search result; and
      adjusting a score associated with both the particular search result and the identified accent based on the signal, wherein adjusting the score comprises incrementing the score when the signal indicates that the user has expressed interest in or satisfaction with the particular search result, or decrementing the score when the signal indicates that the user has not expressed interest in or satisfaction with the particular search result.

10. The computer storage medium of claim 9, wherein obtaining the transcription and the data that identifies the accent of the voice query further comprises receiving the transcription and the data that identifies the accent of the voice query from an automated speech recognition (ASR) engine.

11. The computer storage medium of claim 9, wherein providing the search results comprises providing results that have been selected by the search engine based on both the transcription and the identified accent of the voice query.

12. The computer storage medium of claim 9, wherein data that identifies the accent comprises one of an encoded textual description of the accent or a bit field that includes flag bits to identify the accent.

13. The computer storage medium of claim 9, wherein providing the search results comprises providing results that have been selected by the search engine based on the transcription, and that have been ranked by the search engine based on the identified accent of the voice query.

14. The computer storage medium of claim 9, wherein providing the search results comprises providing one or more results that are expressed in a first language, and one or more results that are expressed in a second, different language that is associated with the identified accent of the voice query.

15. The computer storage medium of claim 9, wherein the accent is identified by a user selection or preference.

16. A computer-implemented method comprising:
   obtaining a transcription of a voice query;
   obtaining data that identifies an accent of the voice query;
      submitting (i) the transcription of the voice query and (ii) the data that identifies the accent of the voice query, to a search engine;
      in response to submitting (i) the transcription of the voice query and (ii) the data that identifies the accent of the voice query, to a search engine, receiving one or more search results;
   providing one or more of the search results to a client device for display;
      in response to providing the one or more search results, receiving a signal indicating that a user has or has not expressed interest in or satisfaction with a particular search result; and
      adjusting a score associated with both the particular search result and the identified accent based on the signal, wherein adjusting the score comprises incrementing the score when the signal indicates that the user has expressed interest in or satisfaction with the particular search result, or decrementing the score when the signal indicates that the user has not expressed interest in or satisfaction with the particular search result.

\* \* \* \* \*

UNITED STATES PATENT AND TRADEMARK OFFICE
CERTIFICATE OF CORRECTION

PATENT NO. : 8,417,530 B1
APPLICATION NO. : 12/860069
DATED : April 9, 2013
INVENTOR(S) : Barry Hayes It is certified that error appears in the above-identified patent and that said Letters Patent is hereby corrected as shown below:

In the Claims

Column 11, line 11, Claim 3, please delete "providing" and insert therefor -- providing the --; and Column 11, line 47, Claim 9, please delete "display" and insert therefor -- display; --.

Signed and Sealed this
Thirtieth Day of July, 2013

Teresa Stanek Rea
*Acting Director of the United States Patent and Trademark Office*